A. J. DONOVAN AND F. POKORNY, JR.
APPARATUS FOR THE ATOMIZATION OF LIQUID FUEL.
APPLICATION FILED AUG. 5, 1922.
Reissued Nov. 21, 1922. 15,494.
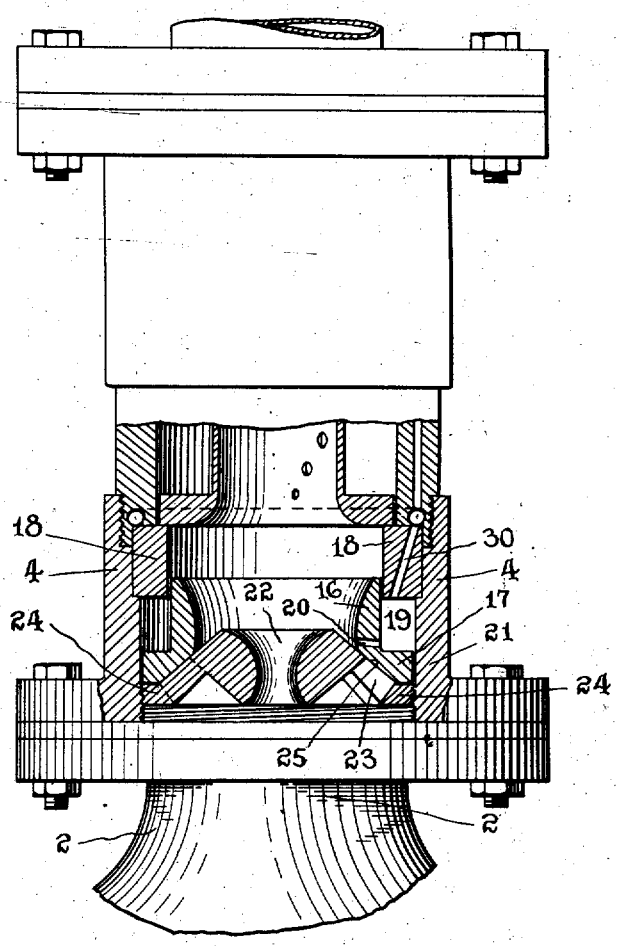
Arthur J. Donovan
and Frank Pokorny Jr.
Inventors,
By their Attorneys
Fetherstonhaugh & Co.

Reissued Nov. 21, 1922. Re. 15,494

UNITED STATES PATENT OFFICE.

ARTHUR J. DONOVAN, OF ARDSLEY, AND FRANK POKORNY, JR., OF MAMARONECK, NEW YORK, ASSIGNORS, BY DIRECT AND MESNE ASSIGNMENTS, OF ONE-HALF TO SAID POKORNY AND ONE-HALF TO FRANCIS W. KEEGAN, BOTH OF NEW YORK, N. Y.

APPARATUS FOR THE ATOMIZATION OF LIQUID FUEL.

Original No. 1,290,523, dated January 7, 1919, Serial No. 229,909, filed April 22, 1918. Application for reissue filed August 5, 1922. Serial No. 579,954.

*To all whom it may concern:*

Be it known that we, ARTHUR J. DONOVAN and FRANK POKORNY, Jr., citizens of the United States, and residents, respectively, of Ardsley, in the county of Westchester, and Mamaroneck, in the county of Westchester, both in the State of New York, have invented certain new and useful Improvements in Apparatus for the Atomization of Liquid Fuel, of which the following is a clear and exact specification, reference being had to the accompanying drawing, which forms a part of this application.

This invention relates to an apparatus for atomizing liquid fuel, and our present application, which is Division C of our application for Reissue Patent, Ser. No. 378,254 filed May 1, 1920, and is directed to means for effecting the impingement of separate streams of fuel mixture upon each other, so that the fuel particles may be finely divided by the force of impaction thus provided, and whereby, in the confluence of the two streams thus provided, there may be set up a state of intermixture between the air and fuel most suitable for combustion.

In the example of apparatus herein illustrated for performing the purpose of our invention we have shown the same structure as that comprised in our co-pending reissue application, previously referred to, which is in the form of a governor, and includes a passage connecting an engine intake 1 with a carbureter 2.

This divisional application is not concerned primarily with the fuel mixture governing features of the structure represented in the drawing, and they will not therefore be described herein.

Those elements of the indicated structure which co-operate to perform the functions of this application include a piston element, which serves as a supply throttle and consists of an annulus 16, having a radial flange 17 at its lower portion, the periphery of said flange being slidable against the inner surface of portion 4 of the connecting passage, in the movement of said annulus, whose outer surface rides against the inner surface of a concentric member 18, in the functioning of said piston element.

Thus a chamber 19 is bounded by the annulus 16, its flange 17, the portion 4 and the under surface of member 18; said chamber being contractable and expansible with the movement of said annulus. An orifice, as 20, through the annulus 16, permits exhaustion of the chamber 19 under the aspiratory force of the motor, thus rendering said annulus responsive in movement to that influence. Normally the annulus 16 is seated upon a base, as 21, which may form part of a choke device, here shown as a Venturi tube 22, connected, as by radial arms 23, with a threaded portion 24, screwed into portion 4. When the annulus is seated, as stated, the spaces between the arms 23 are thereby covered and fuel mixture can then only be drawn through the venturi, flowing thus in restricted quantity, as for motor idling purposes; but when the annulus has been lifted up, then additional fuel passage is available through the spaces between the arms 23, and between the outer surface of the Venturi tube and the under surface of the annulus 16, the extent and capacity of the passage varying according to the degree to which the annulus is raised.

With the lift of supply throttle 16 fuel mixture is caused to flow between the inclined surface 25 of said supply throttle and the outer wall of the venturi, this fluid flow being accorded a convergent direction by the inward and upward angle of said inclined surface 25, so that in fact the volume of fluid enters the passage in conoidal form. Since at the same time fuel mixture is also flowing, under the same suction influence created by the engine in its aspiratory operation, through the axial orifice of the venturi, it follows that the two separate volumes of fluid admitted to the passage enter into impinging relation which results in a fuel pulverizing action, whereby the fuel particles in each volume become more finely subdivided and all are intimately intermingled in and dispersed throughout the combined volumes to constitute a highly combustible mixture. Also, due to the outwardly flared form of the venturi exit, the central stream of fluid mixture issuing therefrom tends to spread or diverge toward the other or convergent fuel mixture flow, which has the effect of intensifying the force of impact between the two volumes of fluid, thereby enhancing the value of the bombardment between the fluid streams in their fuel pulverizing and mixture making characteristics.

Variations within the spirit and scope of our invention are equally comprehended by the foregoing disclosure.

We claim:—

1. In fuel mixture supply means for internal combustion engines, in combination, means permitting a central flow of fuel mixture, and means permitting a concentric, variable flow of fuel mixture, said flow permitting means causing the separate flows of fuel mixture to enter into impinging relation with one another.

2. In fuel mixture supply means for internal combustion engines, the provision of separate means for causing the fuel mixture to flow in different streams, one of said streams having variable flow, said separate means also being arranged to direct the different streams into impinging relation with one another for commingling purposes.

3. In fuel mixture supply means for internal combustion engines, the provision of separate means for causing the fuel mixture to flow in different, concentric streams, one of said streams having variable flow, said separate means also being arranged to direct the different streams into impinging relation with one another for commingling purposes.

Signed at White Plains, in the county of Westchester and State of New York, this 29th day of July, 1922.

ARTHUR J. DONOVAN. [L. S.]
FRANK POKORNY, Jr. [L. S.]